(12) United States Patent
D'Amico et al.

(10) Patent No.: US 6,282,961 B1
(45) Date of Patent: Sep. 4, 2001

(54) PERMANENT MAGNET ROTARY ACCELEROMETER

(75) Inventors: Carmine D'Amico, Deerfield Beach; Scott H. Starin, Parkland, both of FL (US)

(73) Assignee: CDA Astro InterCorp, Deerfield, FL (US)

( * ) Notice: Subject to any disclaimer, the term of this patent is extended or adjusted under 35 U.S.C. 154(b) by 0 days.

(21) Appl. No.: 09/405,876

(22) Filed: Sep. 24, 1999

(51) Int. Cl.$^7$ .................................................. G01P 3/00
(52) U.S. Cl. ............................................................ 73/514.39
(58) Field of Search ........................ 73/519.01, 862.331, 73/862.332; 324/174, 207.25

(56) References Cited

U.S. PATENT DOCUMENTS

| | | |
|---|---|---|
| 2,090,521 | 8/1937 | Serrell . |
| 3,178,641 | 4/1965 | Varterasian . |
| 3,555,326 | 1/1971 | Talebi et al. . |
| 4,207,769 | 6/1980 | Andrews . |
| 4,507,607 | 3/1985 | Caputo . |
| 4,678,994 | 7/1987 | Davies . |
| 4,798,378 | 1/1989 | Jones . |
| 4,984,463 | 1/1991 | Idogaki et al. . |
| 5,251,484 | 10/1993 | Mastache . |
| 5,311,111 | 5/1994 | Karpol et al. . |
| 5,336,983 | 8/1994 | Watanabe . |
| 5,521,772 | 5/1996 | Lee et al. . |
| 5,528,140 | * 6/1996 | Fuki et al. ...................... 324/207.12 |
| 5,744,720 | * 4/1998 | Ouchi ............................... 73/514.39 |
| 5,939,878 | * 8/1999 | Dong ............................... 324/207.17 |
| 5,967,669 | * 10/1999 | Ouchi ................................... 384/448 |

* cited by examiner

*Primary Examiner*—Richard A. Moller
(74) *Attorney, Agent, or Firm*—Gunster, Yoakley & Stewart, P.A.

(57) ABSTRACT

A rotary accelerometer having a nonrotatable cylindrical magnet return path formed out of magnetic permeable material. One or more permanent magnets, with two opposite poles, are disposed around the magnetic return path. An electrically conductive cup with an access for rotation therearound in which the cup surrounds the permanent magnets and the permanent magnets are arranged so as to produce a magnetic field through the cup into the nonrotatable cylindrical magnet return path, thereby inducing eddy currents inside the cup when rotating in the magnetic field. A stator core is formed out of magnetic permeable material surrounding the cup and nonrotatable relative thereto, the stator core having at least two pickup members. The stator is formed from at least one continuous piece of magnetic permeable material. One or more stator windings are disposed on to the pickup members of the stator core for sensing changes in a secondary magnetic field generated by the eddy currents in the cup.

13 Claims, 6 Drawing Sheets

FIG. 1B (SECTION I-I)

FIG. 2B (SECTION II-II)

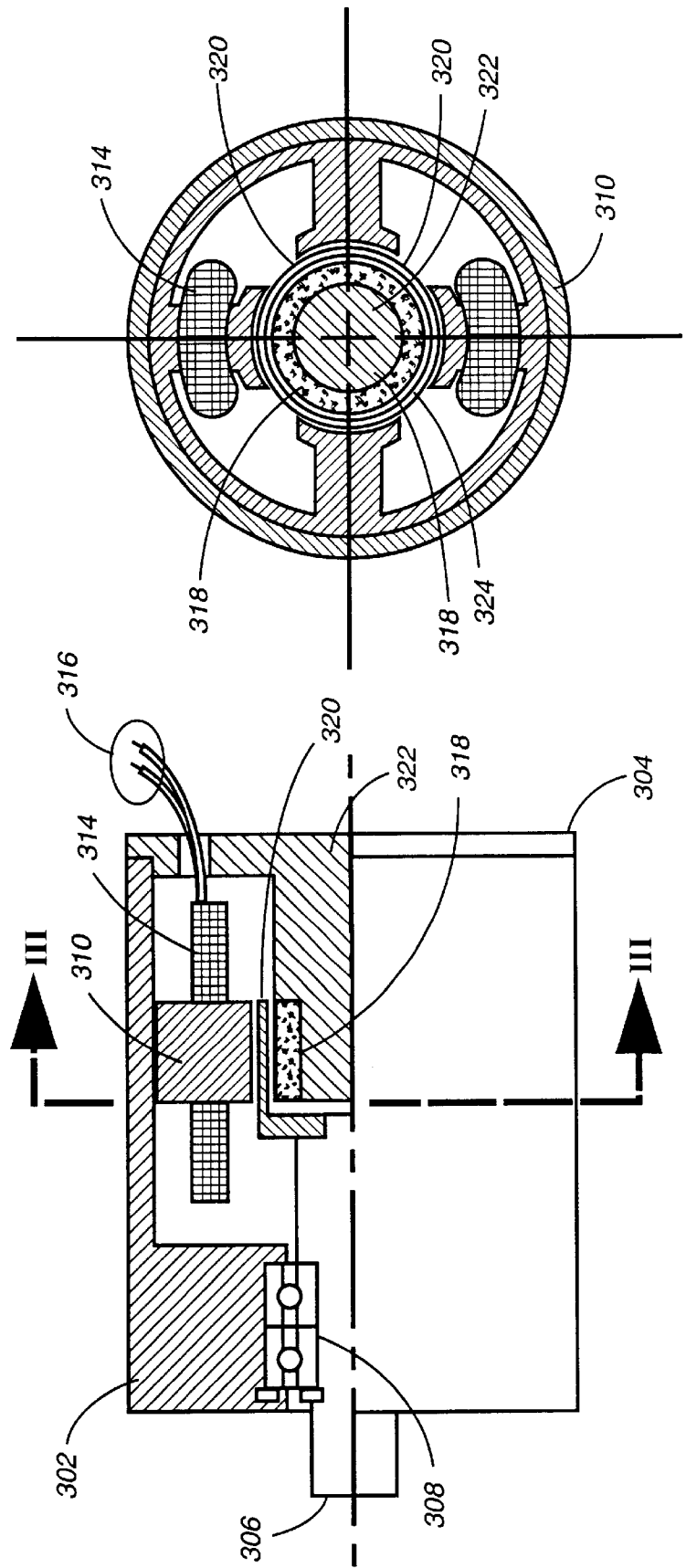

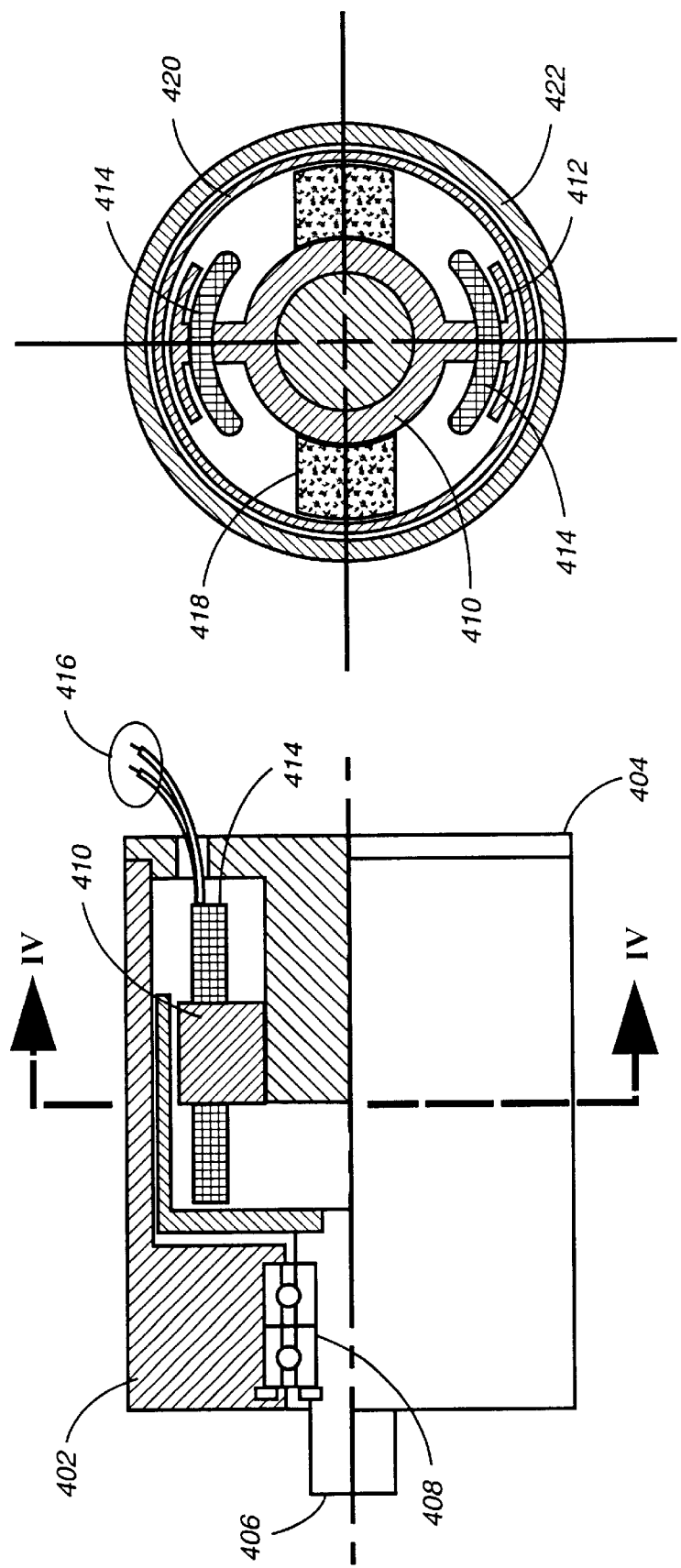

FIG. 5B (SECTION V-V)

PERMANENT MAGNET ROTARY ACCELEROMETER

CROSS-REFERENCE TO RELATED APPLICATIONS

Not applicable

BACKGROUND OF THE INVENTION

1. Field of the Invention

The invention disclosed broadly relates to the field of accelerometers and more particularly to permanent magnet accelerometers for sensing rotational or angular acceleration.

2. Description of the Related Art

Rotary accelerometers have been in existence for years. Rotary accelerometers may be used to provide closed loop motion control of a load through the use of feedback techniques. The acceleration signal from an accelerometer may be used to electronically simulate larger, smaller or varying system inertia. One example of a DC (Direct Current) excited rotary accelerometer can be found in U.S. Pat. No. 2,090,521, entitled "Accelerometer", by inventor Robert Serrell, and issued on Aug. 17, 1937. (Hereinafter this patent is referred to as Serrell.) This accelerometer makes use of the phenomenon of armature reaction in a rotating dynamo-electric apparatus to provide an indication of the magnitude of the acceleration. The magnitude of the magnetic field produced by currents induced in the armature of a generator varies with acceleration of the rotating member.

Another accelerometer is disclosed in U.S. Pat. No. 3,178,641 entitled "Drag Cup Tachometer Accelerometer" by inventor J. H. Varterasian, issued on Apr. 13, 1965. (Hereinafter this patent is referred to as Varterasian.) This is a DC excited accelerometer that provides a conductive drag cup of a tachometer generator with alternating current and direct current excitation. The device processes an alternating current and a direct current output signals which are a function of the drag cup speed and acceleration respectfully.

Another rotary accelerometer is disclosed is U.S. Pat. No. 4,507,607, entitled "Angular Accelerometer" by Inventor William R. Caputo, issued on Mar. 26, 1985. (Hereinafter this patent is referred to as Caputo.) Disclosed is an angular accelerometer with DC excitation which generates a direct usable signal and stationary coil proportional to the instantaneous acceleration rate of a rotary element.

Yet another rotary accelerometer is disclosed in U.S. Pat. No. 3,555,326 entitled "Accelerometer for a Vehicular Anti-Skid System with Sheet Loader" by Inventors Abootaleb Talebi et al., issued Jan. 12, 1971. (Herein after this patent is referred to as Talebi.) This permanent rotary accelerometer has a solid cylindrical ferromagnetic rotor rotationally coupled to a vehicle wheel and coated with conductive non-ferromagnetic metal sheet.

Although all these rotary accelerometers are useful they are not without their shortcomings. One shortcoming of other acceleration processes is the use of position or velocity signals to derive acceleration signal. The double differentiation of a position signal or the single differentiation of a velocity signal is accomplished using analog and digital differentiation circuitry. This differentiation process adds electrical noise to the output signal. This noise is undesirable for high performance systems. Accordingly, a need exists for an accelerometer that eliminates the differentiation circuitry and provides an acceleration output signal directly.

Continuing further, several of the patents by Serrell, Varterasian and Caputo referenced above, use DC excitation. One shortcoming of the use of DC excited accelerometers is that the output gain signal for the acceleration is dependent on the excitation signal for the direct current excitation. The dependence on the excitation signal can lead to a wide drift in accelerometer output signal. Therefore, a need exists to provide an accelerometer whose output voltage is more stable and does not fluctuate when the input voltage shifts.

Another shortcoming of the use of DC excited accelerometers is that a power source is required to produce the DC voltage along with the companion filtering circuitry and often times a rectifier to condition the power source. These additional components add cost and weight, and besides adding cost and adding weight, also increase the size of the accelerometers. Large accelerometer configurations are difficult to integrate on a motor or other rotating machine. Many times, designer engineers make use of mechanical couplings to integrate motors into specific applications. However, these couplings add weight and space. In addition, these couplings contribute to windup and electrical noise in the accelerometer output signal. Accordingly, a need exists for a compact configuration of an accelerometer which may be integrated directly into an electric motor or other similar rotating machine.

Another shortcoming with the use of DC excited accelerometers is that in regards to the output, ripples, fluctuations or any noise present in a DC excitation source are translated to the accelerometer output signal. This produces an undesirable signal-to-noise ratio on the output. To eliminate this undesirable noise, the output signal requires filtering which adds lag between the rotation of the shaft being measured and the output of the signal being produced. Accordingly, a need exists for a rotary accelerometer that provides a direct output signal and does not require excessive filtering or demodulation.

Another shortcoming of the use of DC excited accelerometers is that output power level or gain is lower than permanent magnet excitations. Stated differently, the output voltage per unit of acceleration is much lower within a given frame size. Accordingly, a need exists to provide an accelerometer that has high output voltage levels.

Turning now to the permanent magnet accelerometers available today, such as the permanent magnet accelerometer disclosed by the Talebi patent, there are several shortcomings. One shortcoming of Talebi as shown in FIG. 2 is that pick up coil 6A and 6B are separate from magnetic shells 4 and 5 of FIG. 2. These separate pieces reduce the amount of sensitivity that can be measured with this device. Accordingly, a need exists to provide a permanent magnet accelerometer with high acceleration sensitivity.

Another shortcoming of the permanent magnet accelerometer disclosed by the Talebi patent is that the rotor uses a coating that is galvanically (electroplating) applied. The uniformity of coatings and platings are difficult to maintain during the manufacturing processes. Moreover, environmental conditions such as shock and vibrations reduce the effectiveness of the plating. Accordingly, a need exists for an accelerometer that overcomes this shortcoming and is able to perform in harsh environments.

Still another shortcoming of the permanent magnet accelerometer disclosed by Talebi is that the stator winding core pieces 7, 8 and 9 of FIG. 1 and FIG. 2 are constructed from distinct pieces of ferromagnetic material. Stated differently, the stator winding core pieces 7, 8, and 9 are fabricated from at least three different pieces. The use of separate stator winding core pieces does not provide maximum sensitivity of pickup coils 6a and 6b due to the increase in magnetic reluctance. Moreover, for the application of accelerometers in a harsh environments such as aerospace applications, the exposure to wide temperature fluctuations, vibrations, and shock and high g-forces is not structurally sound. Accordingly, a need exists for an accelerometer that has very high sensitivity even in demanding applications in harsh environments.

SUMMARY OF THE INVENTION

Briefly, in accordance with the present invention, a rotary accelerometer is used to complement closed loop control systems such as brushless D.C. motors, stepper motors, A.C. motors, hydraulic motors, pneumatic motors, or any other device which is controlled through rotary motion. The rotary accelerometer provides a direct output of the acceleration signal and can be integrally mounted to a motor or other rotating machine. The four components whose configuration changes in the various embodiments are as follows: (i) nonrotating permanent magnets; (ii) a nonrotating stator core; (iii) a rotating electrically conductive cup; and (iv) a rotating or nonrotating (depending on the configuration) magnetically permeable return path. Five different embodiments are described for various configurations of these four components.

In one embodiment, a permanent magnet rotary accelerometer comprising: a cylindrical magnetic return path formed out of magnetic permeable material; an electrically conductive cup with an axis for rotation there around, the cup surrounding the magnetic return path; one or more sets of permanent magnets having opposite magnetic polarity, surrounding the cup, for a producing magnetic field through the cup into the magnetic return path, thereby inducing eddy currents inside the cup when rotating in the magnetic field; a stator core formed out of magnetic permeable material surrounding the cup and nonrotatable relative thereto, the stator core comprising at least two pick up members and a stator core return path therein, wherein the pick up members and the stator core return path are formed from at least one continuous piece of magnetic permeable material; and one or more pickup coils disposed on the pickup members of the stator core for sensing changes in a secondary magnetic filed generated by the eddy currents in the cup.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 1B is a cross-sectional view of the permanent magnet accelerometer of FIG. 1A taken along lines I—I.

FIG. 2B is a cross-sectional view of the permanent magnet accelerometer of FIG. 2A taken along lines II—II.

FIG. 3A is a partial side view of the third embodiment of the permanent magnet accelerometer with magnets positioned inside a rotating cup, a nonrotating state core positioned outside the cup and a nonrotating magnetic return path inside the cup, according to the present invention.

FIG. 3B is a cross-sectional view of the permanent magnet accelerometer of FIG. 3A taken along lines III—III.

FIG. 4A is a partial side view of the forth embodiment of the permanent magnet accelerometer with magnets positioned inside a rotating cup, a nonrotating stator core positioned inside the cup and a nonrotating magnetic return path outside the cup that rotates according to the present invention.

FIG. 4B is a cross-sectional view of the permanent magnet accelerometer of FIG. 4A taken along lines IV—IV.

FIG. 5B is a cross-sectional view of the permanent magnet accelerometer of FIG. 1A taken along lines V—V.

DETAILED DESCRIPTION OF SEVERAL EMBODIMENTS

Overview of Mechanical Configuration for Housing

Figure 1A:
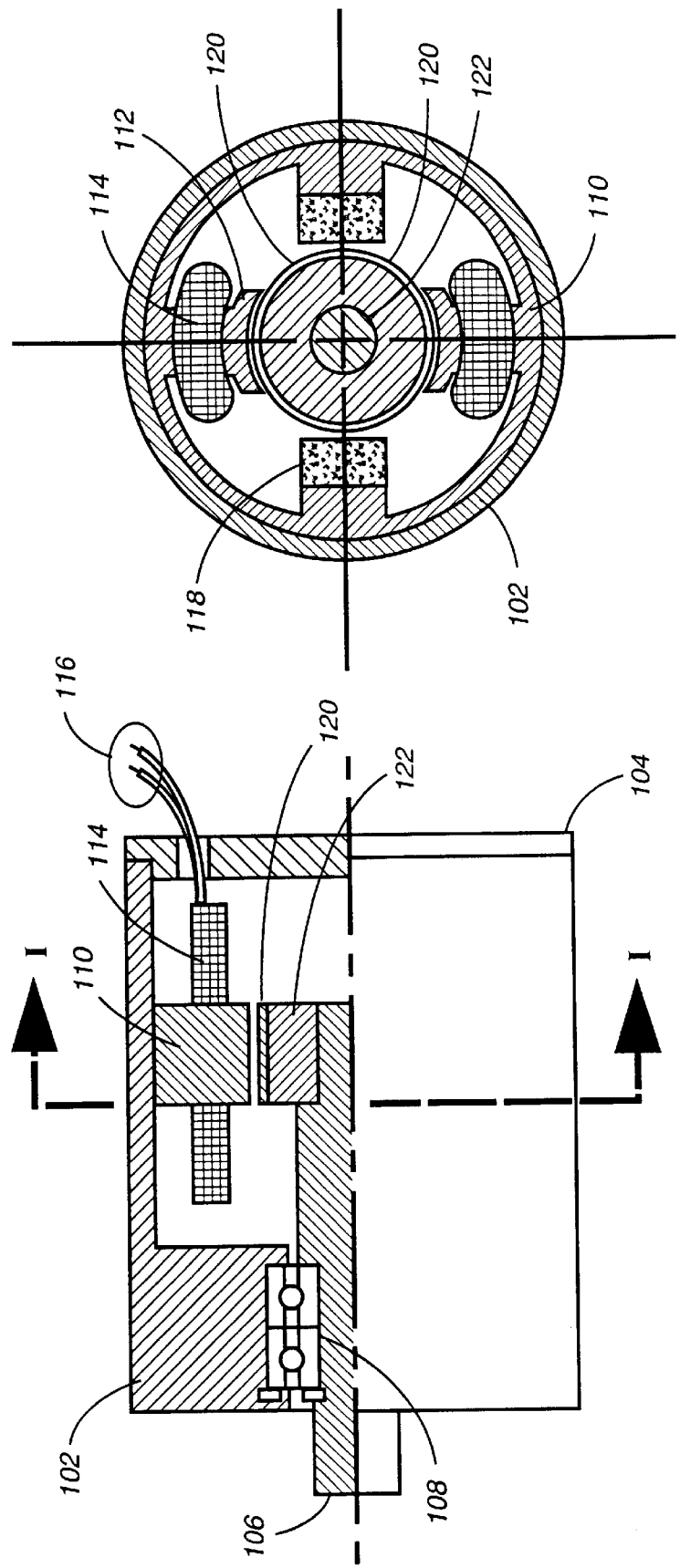
FIG. 1A is a partial side view of the first embodiment of the permanent magnet accelerometer with magnets positioned outside a rotating cup, a nonrotating stator core positioned outside the cup and a rotating magnetic return path inside the cup, according to the present invention.

Referring now in more detail to the drawings in which like numerals refer to like parts throughout several views FIG. 1A shows a partial side view of the first embodiment of the permanent magnet accelerometer 100 and FIG. 1B is a cross-sectional view of the permanent magnet accelerometer of FIG. 1A taken along lines A–A', according to the present invention. A housing 102 with an end bell 104 encloses the internal components of accelerometer 100. A mechanical input shaft 106 is coupled to a motor (not shown), such as a electrical, pneumatic, hydraulic, combustion or equivalent, rotating machine. One example of an electrical rotating machine is a stepper motor. A plurality of bearings 108, such as roller, needle, ball bearings or equivalent, are used to reduce the friction of input shaft 106 turning in housing 102. A stator core 110 forms an integral return path with pickup members 112. The stator core 110 senses the change in eddy currents induced in an electrically conductive cup 120 as further described below. It is important to note that the stator core 110 is formed out of magnetic permeable material, such as silicon iron or Hyperco 50, for example. All of the stator core 110 including the integral return path with pickup members 112 are formed from one continuous piece of material. This single piece design of stator core 110 provides lower reluctance, higher output voltages and increased sensitivity to the eddy currents induced in the cup 120. In one embodiment, the stator core 110 is machined from one piece of magnetically permeable material. In another embodiment, the stator core is a laminate or of sintered construction, where two or more layers of magnetically permeable material are sandwiched together. At least one layer is one piece that forms a low reluctance path between the pickup members 112. In addition, the single piece design of stator core 110 is very rugged and can operate effectively in harsh environments, such as aerospace, where the accelerometer 100 is subjected to a wide range of temperature fluctuations, constant shock and vibration, and large gravitational forces. Stator windings 114 are wound around or embedded in the stator core 110 near pickup members 112. Electrical output wires 116, provide a signal from the stator windings 114 which is proportional to the eddy currents induced in the cup 120 rotating in a magnetic field formed between magnets 118.

The complementary components of housing 102, mechanical input shaft 106, end bell 104 and bearings 108, are only one of many mechanical adaptations to the accelerometer 100 according to the present invention and several other configurations of these complementary components are possible to provide the proper alignment of these components with the components that are discussed in FIG. 1B.

Next several alternative embodiments are described and shown for various configurations of four components of the accelerometer 100 according to the present invention. The four components whose configuration changes in the various embodiments are as follows: (i) nonrotating permanent magnets; (ii) a nonrotating stator core; (iii) a rotating electrically conductive cup; and (iv) a rotating or nonrotating (depending on the configuration) magnetically permeable return path. Five different embodiments are described for various configurations of these four components. The first configuration is used to provide a brief overview of the magnetic theory and the measured results. The basic mechanical configurations for the housing 102, mechanical input shaft 106, end bell 104, bearings 108, the construction of stator core 110 and stator windings 114, permanent magnets 118 and cup 120 is similar in all rest of embodiments described below. In other words, FIGS. 2A, 3A, 4A and 5A have similar construction for these components.

First Embodiment of Accelerometer Components

One or more pairs of nonrotating permanent magnets 118 are positioned outside the electrically conductive rotating cup 120. The cup 120 is mounted on shaft 108 and is made out of any material, such as copper, that has low electrical resistance but high magnetic reluctance. A magnetically permeable return path 122 is disposed on shaft 106. In one embodiment, the magnetically permeable return path 122 and the shaft 106 are formed from a single piece of magnetically permeable material. In another embodiment, the magnetically permeable return path 122 is a separate price of magnetically permeable material attached to shaft 106. The pair of permanent magnets 118, with opposite magnet polarity, form a magnetic field (not shown) through the cup into the magnetic return path. The cup 120 mounted on input shaft 108 rotates through the magnetic field formed by magnets 118 and induces eddy currents within the cup 120 under principals know in the art, such as Faraday's and Maxwell's Laws. The eddy currents formed in the cup 120 are proportional to the angular acceleration at which the cup 120 moves through the magnetic field. The pickup members 112 of stator core 110 sense the magnitude of the secondary magnetic field generated by the eddy currents that form in the cup 120. The word "secondary" magnetic field is used to distinguish from the magnetic field produced by the permanent magnets. A signal is produced by the stator windings 114 on to wire 114 directly proportional to the eddy currents. It should be understood that no D.C. excitation is needed with the permanent magnets so that the power requirements of prior art D.C. accelerometers are eliminated.

Figure 6A:
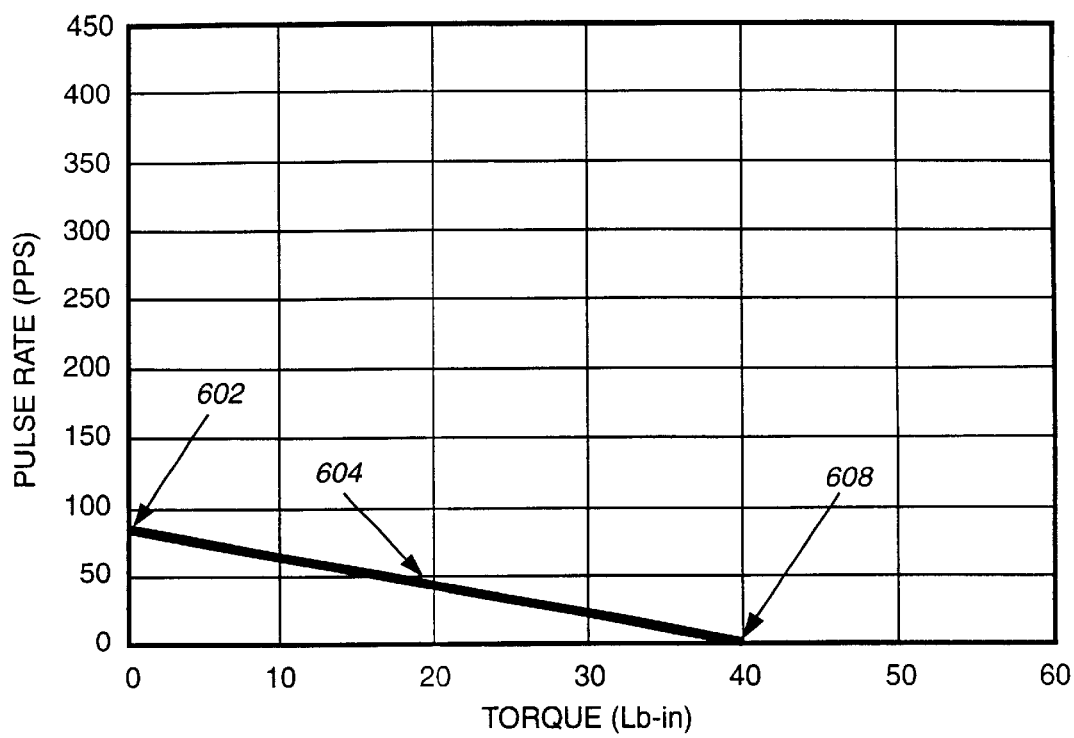
FIG. 6A is a graph of an open loop stepper motor without using an accelerometer.
Figure 6B:
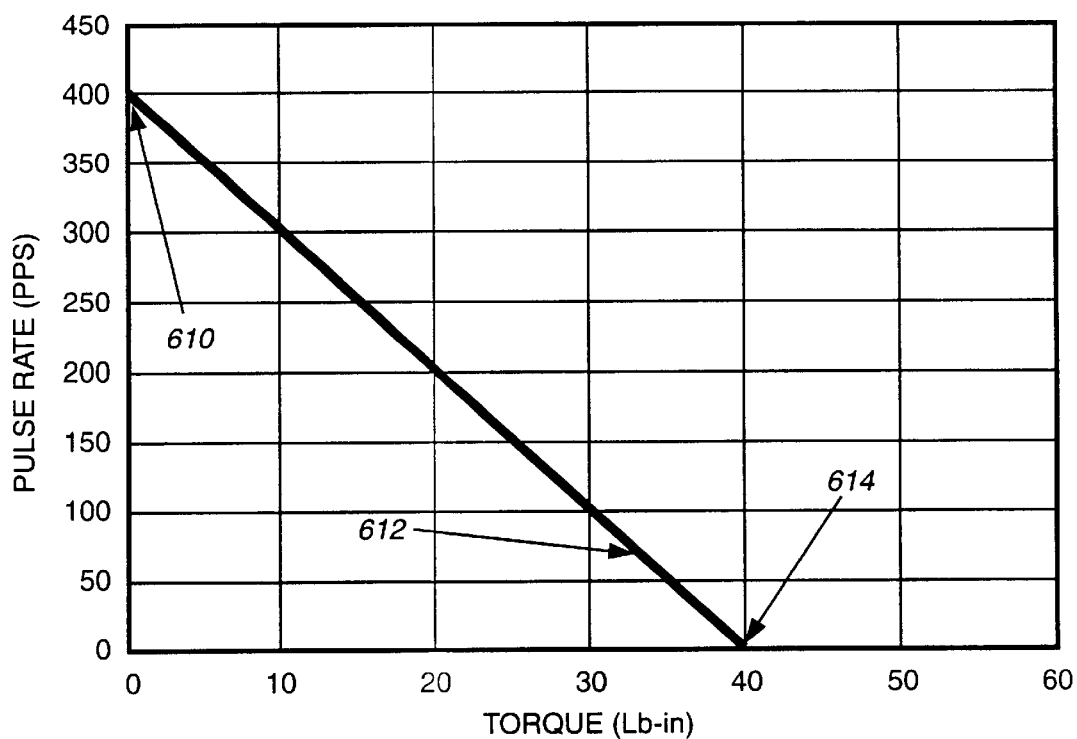
FIG. 6B is a graph of an open loop stepper motor of FIG. 6A using the accelerometer according to the present invention.

Turning now to FIG. 6, shown are two graphs that illustrate the performance enhancements realized with the accelerometer 300 (as described below) according to the present invention. More specifically, FIG. 6A is a graph of an open loop stepper motor without using an accelerometer 100. A C.D.A. Intercorp type 16-206-20 stepper motor coupled to a 100:1 gear head with a inertia factor of 38 is used. The Y-axes of the graph is in pulses per second and the X-axes are in units of Torque (lb.-in). FIG. 6B is a graph of the stepper motor of FIG. 6A using the accelerometer according to the present invention. It is important to note that the scale and the components of FIG. 6A and 6B are identical. To those skilled in the art, a comparison of FIG. 6A with 6B illustrates several performance enhancements. The use of the accelerometer according to the present invention provides performance enhancements of higher torques and operating velocities. In addition, the accelerometer of the present invention has no "lost steps" and pulse by pulse information is provided. The resonance areas, or unstable performance are inherently nullified, and dynamic speed versus torque is realized. Those skilled in the art of stepper motor application will notice the performance enhancements of the response rate, 610, the pull in torque 612, and the torque at low pulse rate 614, as compared with the FIG. 6A.

The accelerometer 100 is an extremely useful component in high performance and/or high load inertia servo actuator systems. Since the accelerometer 100 requires no excitation or demodulation, the DC output may be directly Op-Amp integrated for an angular rate damping signal of the motor. This information, along with the angular acceleration signal provides tremendous flexibility in contouring the system response, and controlling the transfer function.

The accelerometer 100 can make the motor rotor inertia electronically "look" larger or smaller through this feedback technique. This electronic technique is like adding a variable electronic "flywheel" to the system, and provides a higher order effect, as compared to electronic damping through tachometer feedback. This may provide high forward loop gain, while maintaining a stable servo system. The electronic flywheel may be controlled to provide these characteristics dynamically in the system. Other advantages include acceleration control, and disturbance attenuation.

Second Embodiment of Accelerometer Components

Figure 2A:
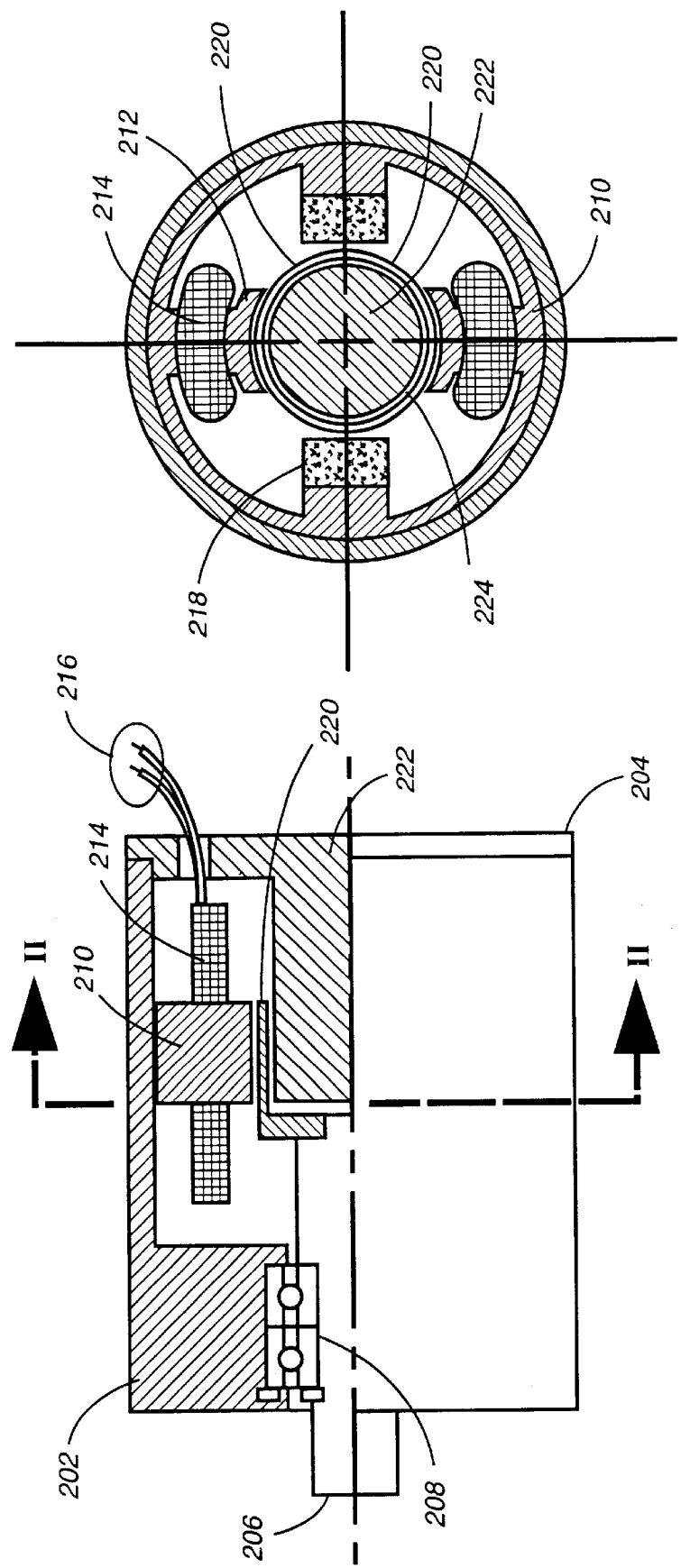
FIG. 2A is a partial side view of the second embodiment of the permanent magnet accelerometer with magnets positioned outside a rotating cup, a nonrotating stator positioned outside the cup and a nonrotating magnetic return path inside the cup, according to the present invention.

The second embodiment of an accelerometer 200 is illustrated in FIGS. 2A and 2B. The components are numbered to correspond to the similar components of FIG. 1. For example permanent magnets are 218 where in FIG. 1, they are numbered 118, and housing in FIG. 2 is numbered 202 where the housing in FIG. 1 is numbered 102 and so on. The structural difference between the second embodiment and the first embodiment, is that like first embodiment, the cup 220 rotates, but the magnetic return path 222 inside the cup 220, unlike in the first embodiment, does not rotate. There is a small air gap 224 formed between the rotating cup 220 and the nonrotating magnetic return path 222. Only the rotating cup 220 is coupled to the mechanical input shaft 206. In addition, the end bell 204 may serve as an optional magnetic return path. This design of accelerometer 200 has lower rotating inertia as compared with the first embodiment because only the cup 220 and not the magnetically permeable return path 222 rotates.

Third Embodiment of Accelerometer Components

The third embodiment of an accelerometer 300 is illustrated in FIGS. 3A and 3B. The components are numbered to correspond to the similar components of FIG. 1. The structural difference between the third embodiment and the first embodiment, is that like first embodiment, the cup 320 rotates, but the magnetic return path 322 inside the cup 320, unlike in the first embodiment, does not rotate. There is a small air gap 324 formed between the rotating cup 320 and the nonrotating magnetic return path 322. Only the rotating cup 320 is coupled to the mechanical input shaft 306. The permanent magnets 318 have been moved to be positioned inside the cup 320. The permanent magnets are disposed on magnetically permeable return path 322. In addition, the end bell 304 may serve as an optional magnetic return path. This design of accelerometer 300 has lower rotating inertia as compared with the first embodiment because only the cup 320 and not the magnetically permeable return path 322 rotates. Because the magnets are positioned inside the cup 320, bonded ring magnets may be used for permanent magnets 318. In addition, this design of accelerometer 300 exhibits some of the most rugged design characteristics for harsh environments and some of the highest output voltage as compared with other embodiments.

Fourth Embodiment of Accelerometer Components

The fourth embodiment of an accelerometer 400 is illustrated in FIGS. 4A and 4B. The components are numbered to correspond to the similar components of FIG. 1. The structural difference between the fourth embodiment and the first embodiment, is that like first embodiment, the cup 420 rotates, but all of the other components, unlike the first embodiment, all of the components, the stator core 410 including the integral return path with pickup members 412, the permanent magnets 418, and the windings 414 are all mounted inside the rotating cup 420. The magnetic permeable return path 422 is outside the rotating cup 420. In one embodiment is the housing 402 serves as the magnetic permeable return path. And in another embodiment, the magnetic permeable return path 422 is a sleeve inside the housing 402. This design of accelerometer 400 exhibits some of the lowest cost to manufacture because of the ease of construction.

Fifth Embodiment of Accelerometer Components

Figure 5A:
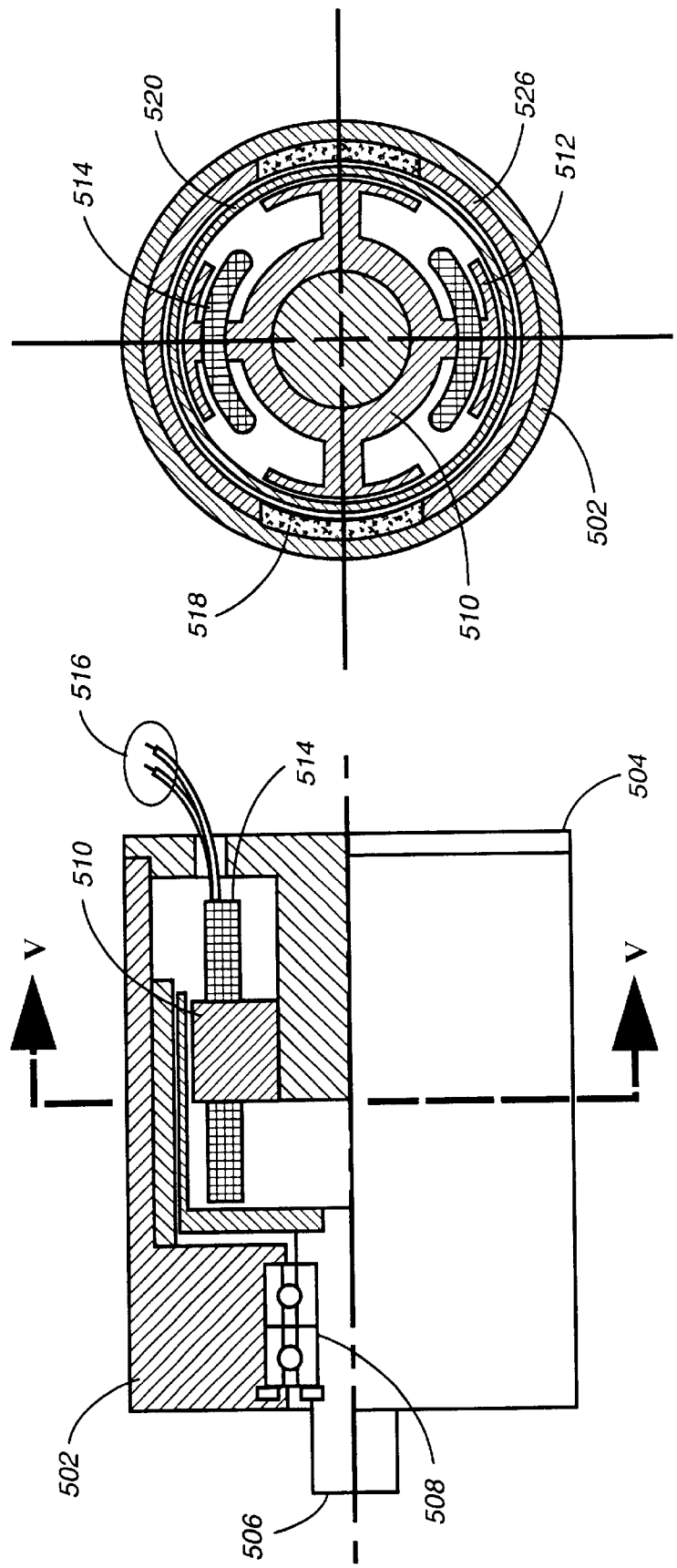
FIG. 5A is a partial side view of the fifth embodiment of the permanent magnet accelerometer with magnets positioned outside the cup, a nonrotating stator core positioned inside the cup and a nonrotating magnetic return path outside the cup that is stationary according to the present invention.

The fifth embodiment of an accelerometer 500 is illustrated in FIGS. 5A and 5B. The components are numbered to correspond to the similar components of FIG. 1. The structural difference between the fifth embodiment and the first embodiment, is that like first embodiment, the cup 520 rotates, but all of the other components, unlike the first embodiment, all of the components, the stator core 510 including the integral return path with pickup members 512, and the windings 514 are all mounted inside the rotating cup 520. The magnetic permeable return path 522 and the permanent magnets are outside the rotating cup 520. In one embodiment is the housing 502 serves as the magnetic permeable return path. And in another embodiment, the magnetic permeable return path 522 is a sleeve inside the housing 502. This design of accelerometer 500 exhibits some of the lowest cost to manufacture because of the ease of construction.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A rotary accelerometer comprising:
   a nonrotatable cylindrical magnetic return path formed out of magnetic permeable material;
   one or more permanent magnets, with two opposite magnetic poles, disposed around the magnetic return path;
   an electrically conductive cup with an axis for rotation there around, the cup surrounding the permanent magnets and the permanent magnets are arranged so as to produce a magnetic field through the cup into the nonrotatable cylindrical magnetic return path thereby inducing eddy currents inside the cup when rotating in the magnetic field;
   a stator core formed out of magnetic permeable material surrounding the cup and nonrotatable relative thereto, the stator core comprising at least two pick up members, the stator being formed from at least one continuous piece of magnetic permeable material; and
   one or more stator windings disposed on the pickup members of the stator core for sensing changes in a secondary magnetic field generated by the eddy currents in the cup.

2. The rotary accelerometer according to claim 1, wherein the one or more permanent magnets are bonded magnets.

3. The rotary accelerometer according to claim 1, wherein the stator core is comprised of silicon iron.

4. The rotary accelerometer according to claim 1, wherein the stator core is comprised of Hyperco.

5. The rotary accelerometer according to claim 1, further comprising a rotatable input shaft coupled to the electrically conductive cup, wherein rotation of the input shaft causes rotation of the electrically conductive cup.

6. The rotary accelerometer according to claim 1, wherein there are a plurality of continuous pieces of magnetic permeable material forming the stator core, and wherein the stator core is a laminate.

7. The rotary accelerometer according to claim 1, wherein there are a plurality of continuous pieces of magnetic permeable material forming the stator core, and wherein the stator core is sintered.

8. The rotary accelerometer according to claim 6, wherein the one or more permanent magnets are bonded magnets.

9. The rotary accelerometer according to claim 7, wherein the one or more permanent magnets are bonded magnets.

10. The rotary accelerometer according to claim 5, wherein there are a plurality of continuous pieces of magnetic permeable material forming the stator core, and wherein the stator core is a laminate.

11. The rotary accelerometer according to claim 5, wherein there are a plurality of continuous pieces of magnetic permeable material forming the stator core, and wherein the stator core is sintered.

12. The rotary accelerometer according to claim 10, wherein the one or more permanent magnets are bonded magnets.

13. The rotary accelerometer according to claim 11, wherein the one or more permanent magnets are bonded magnets.

* * * * *